United States Patent [19]

Plackner et al.

[11] Patent Number: 4,645,963
[45] Date of Patent: Feb. 24, 1987

[54] ROTATING-FIELD MACHINE WITH BELL-SHAPED ROTOR HUB AND ROTATABLE STATOR AND CONTROL ELEMENT

[75] Inventors: Kurt Plackner; Rudolf Schamberger, both of Nuremberg, Fed. Rep. of Germany; Max Kirchpfening, deceased, late of Nuremberg, Fed. Rep. of Germany, by Martha M. Kirchpfening, Stefan Kirchpfening, Klaus Kirchpfening, heirs

[73] Assignee: Siemens Aktiengesellschaft, Berlin and Munich, Fed. Rep. of Germany

[21] Appl. No.: 826,110

[22] Filed: Feb. 5, 1986

[30] Foreign Application Priority Data

Feb. 11, 1985 [DE] Fed. Rep. of Germany ....... 3504613

[51] Int. Cl.[4] .......................... H02K 5/00; H02K 5/22
[52] U.S. Cl. ..................................... 310/266; 310/89; 310/254
[58] Field of Search ................. 310/66, 67 R, 89, 254, 310/258, 259, 265, 266

[56] References Cited

U.S. PATENT DOCUMENTS

| 4,025,960 | 5/1977 | Gray et al. | 310/266 |
| 4,056,746 | 11/1977 | Burtis | 310/115 |
| 4,284,914 | 8/1981 | Hagenlocher et al. | 310/89 |
| 4,361,776 | 11/1982 | Hayashi et al. | 310/254 |
| 4,433,472 | 2/1984 | Andoh et al. | 310/89 |
| 4,450,373 | 5/1984 | Miller et al. | 310/89 |
| 4,554,473 | 11/1985 | Müller | 310/67 R |
| 4,564,780 | 1/1986 | Nel | 310/258 |

Primary Examiner—Patrick R. Salce
Assistant Examiner—D. L. Rebsch
Attorney, Agent, or Firm—Kenyon & Kenyon

[57] ABSTRACT

The rotor of a rotating-field machine is mounted to the rotor shaft via a cup-shaped hub which is attached to the shaft in a region thereof proximate to one of two bearings by means of which the shaft is journaled in a stator housing. An electronic control element annularly surrounding the rotor shaft is disposed partially within the rotor hub, an end portion of the control element projecting beyond the rotor hub and being mechanically connected to a stator located radially outwardly from the rotor. The stator and the control element are rotatably mounted in the housing and comprise respective segments which are removable for maintenance purposes through openings in a stator housing.

11 Claims, 1 Drawing Figure

U.S. Patent Feb. 24, 1987 4,645,963
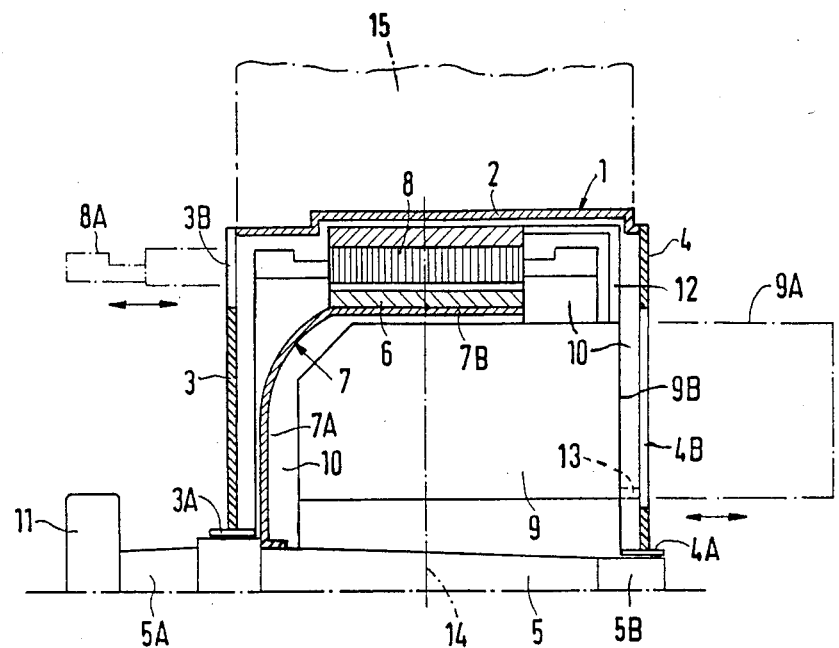

ROTATING-FIELD MACHINE WITH BELL-SHAPED ROTOR HUB AND ROTATABLE STATOR AND CONTROL ELEMENT

FIELD OF THE INVENTION

This invention relates to a rotating-field machine connectable to a torque converter and having an electronic control element. In the case that the rotating-field machine is an electrical generator, the converter serves to couple a drive source to the generator.

Conventional rotating-field machines of this type have a rotor shaft of a uniform diameter and rotor support bearings of substantially the same size. The electronic control element in such a conventional rotating-field machine is disposed outside of the machine housing, which disposition results in a large amount of space that is required for the installation.

If a converter-fed rotating-field machine is subjectable to mechanical vibrations, particularly shocks, it may be necessary to mount the machine and the control element on a vibration-damping base. In larger units, an elastic coupling which has a vibration-damping effect may be provided between the rotating-field machine and a driven or driving machine or component.

A rotating-field machine and especially its control element must frequently be shielded against impermissible energy radiation, which shielding necessitates considerable additional expense and requires correspondingly more space.

An object of the present invention is to provide an improved rotating-field machine of the above-described type.

Another object of the present invention is to provide such a machine, having an electronic control element, which occupies less space than conventional rotating-field machines.

Yet another object of the present invention is to provide such a machine with enhanced protection against shocks.

An additional object of the present invention is to provide such a machine with simplified shielding against undesired energy radiation.

A still further object of the present invention is to provide such a machine in which the overall configuration, including the control element, is shorter than a conventional rotating-field machine.

Yet another object of the present invention is to provide such a machine which has an overall lower cost for the machine bearings.

SUMMARY OF THE INVENTION

In accordance with the present invention, a rotating-field machine connectable to a torque converter comprises a stator housing, a rotor shaft and a first and a second bearing attached to the housing and to the shaft for rotatably supporting the shaft in the housing. The first bearing and the second bearing are spaced from one another along the shaft. The shaft has an extension couplable to the converter, the extension being located on a side of the first bearing opposite the second bearing. In addition, the shaft has a section of reduced diameter between the first and the second bearing, and particularly in a region about the second bearing. Owing to the reduced diameter of the shaft, the second bearing has a smaller diameter than the first.

The rotating-field machine further comprises a rotor and a bell-shaped rotor hub having a base portion rigidly coupled to the shaft in an area thereof juxtaposed to the first bearing. The hub has a flange portion attached to the base portion, which flange portion supports the rotor and projects towards the second bearing from the base portion.

The rotating-field machine further comprises a stator and an electronic control element operatively, i.e., electrically, connected to at least one of the rotor and the stator. The control element annularly surrounds the rotor shaft and has an axial or longitudinal disposition between the hub at one end and the second bearing at an opposite end. The control element is located partially within the hub, while an end portion of the control element projects outside of the hub, this end portion being mechanically coupled to the stator, whereby the stator supports the control element.

In accordance with another particular feature of the present invention, the stator and the control element are rotatably mounted in the housing and the housing is provided with end bells having closable openings, whereby access may be obtained to the stator and the control element for service, inspection and repair work. Advantageously, the stator is divided into segments each individually removable through one of the openings in the end bells of the housing, while the control element is divided into segments each individually removable through another opening in the housing end bells.

By joining the rotor hub to the shaft proximate to one of the bearings (or end bells of the housing), only that first bearing and the portion of the rotor shaft on a side of the rotor hub opposite the second bearing need be designed for the transmission of the torque. The portion of the rotor shaft extending towards the second bearing can be reduced to a substantially smaller diameter inasmuch as only a small portion of the torque is transmitted through the shaft from the rotor hub towards the second bearing. The function of this bearing is essentially only a supporting function. The degree of torque acting on the rotor shaft in the region of the second bearing can be reduced even further if the second bearing is located at a distance from the rotor center plane, i.e., from a transverse plane bisecting the rotor, greater than the distance of the first bearing from that plane.

The reduction of the shaft diameter between the rotor hub and the second bearing results, in the radial direction, in a greater amount of space for the control element. The control element extends in the axial direction past the rotor hub and the rotor itself and terminates close to a respective end bell of the stator housing, whereby free space within the stator housing and in the end area beyond the rotor hub is utilized for the accommodation of the control element. Between the stator housing, the rotor hub and the shaft, there are enough spaces for the internal cooling of the closed machine unit.

BRIEF DESCRIPTION OF THE DRAWING

The sole FIGURE of the drawing is a partial longitudinal cross-sectional view of a rotating-field machine in accordance with the invention.

DETAILED DESCRIPTION

As illustrated in the drawing, a rotating-field machine 1 comprises a stator housing 2 including a first end bell or bearing plate 3 and a second end bell or bearing plate 4. A rotor shaft 5 is rotatably supported in the housing 2 by means of a pair of bearings 3A and 4A connected to respective end bells 3 and 4.

A bell- or cup-shaped rotor hub 7 has a circular base portion 7A fixed to the rotor shaft in an area about bearing 3A. The circular base portion 7A of hub 7 is perimetrically attached to a cylindrical flange portion 7B projecting from the base portion towards bearing 4A and end bell 4. Flange portion 7B supports a rotor element 6, while a stator 8 annularly surrounds rotor 6 within stator housing 2.

The rotating-field machine includes an electronic control element 9 disposed inside the machine housing 2. Control element 9 annularly surrounds rotor shaft 5 and extends axially or longitudinally between base portion 7A of rotor hub 7 and end bell 4 of stator housing 2. Accordingly, one end portion of control element 9 is disposed within rotor hub 7 while an opposite end portion projects beyond the hub and is connected to stator 8 via a mechanical linkage 12, whereby the control element is supported by the stator. If necessary, control element 9 may be connectable for further support to end bell 4 by means of another mechanical linkage 13. Control element 9 is electrically coupled to one or both of stator 8 and rotor 6.

Spaces 10 between control element 9, on the one hand, and rotor hub 7, stator 8 and end bell 4, on the other hand, provide air flow paths for internal cooling of the rotating-field machine.

Rotor hub 7 (in particular base portion 7A), bearing 3A and the portion of shaft 5 in the region of that bearing are designed for the transmission of the entire torque. Inasmuch as very little torque is transmitted over that portion of rotor shaft 5 extending between rotor hub 7 and bearing 4A, the diameter or cross-section of shaft 5 may be reduced exemplarily in a tapered fashion along that portion of the shaft and may terminate in a section 5B having a small diameter. Concomitantly, bearing 4A may have a substantially smaller diameter and overall size than bearing 3A.

The reduction in the diameter of rotor shaft 5 made possible by the present invention not only reduces the total weight of the rotating parts of the machine but also increases the space available for the accommodation of control element 9. Moreover, because of the unilateral connection of rotor hub 7A to shaft 5, the shaft length between bearings 3A and 4A may be decreased while retaining sufficient space for the accommodation of the control element.

Another advantage of a rotating-field machine in accordance with the invention is the reduction in weight and cost of the second bearing 4A. A further decrease in the diameter of shaft section 5B and of bearing 4A may be obtained by spacing that bearing at a greater distance from a central transverse plane 14, which plane bisects rotor 6, than the distance of the other bearing 3A from that plane.

Rotating-field machine 1 may be supported by a conventional vibration-damping structural component 15 connected to stator housing 2. Similarly, when the rotating-field machine is of a relatively large size, a shaft extension 5A of rotor shaft 5 may be connected to a torque converter (not illustrated) or a driven or driving unit (not illustrated) via an elastic coupling 11.

Access for inspection, service or repair work may be obtained to stator 8 and control element 9 through closable access openings 3B and 4B in end bells 3 and 4, respectively. In this connection, it is advantageous to rotatably mount stator 8 and control element 9 in stator housing 2 so that one or two passages or openings 3B, 4B of limited size enable frontal access to all sections of the stator and the control element. It is particularly expedient to provide the access openings at outwardly projecting portions of end bells 3 and 4, whereby the openings may be covered by removable end bell parts. Service, inspection and repair work is further facilitated if stator 8 and control element 9 are assemblies of individual stator segments 8A and control element segments 9A, respectively. These segments may be mounted to each other in a form-locking manner in appropriate racks or frames and are removable from the stator and the control element in an axial direction, as indicated by the double-headed arrows in the drawing.

The accommodation of control element 9 inside rotor hub 7 in stator housing 2 achieves a particularly effective shielding of the control element against energy radiation of an acoustical or electrical nature. Control element 9 can be further shock proofed by interposing a shock-absorbing element (not shown) means between stator 8 and control element 9.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proferred by way of example to facilitate comprehension of the invention and should not be construed to limit the scope thereof.

What is claimed is:

1. A rotating-field machine connectable to a torque converter, said rotating-field machine comprising:
    a stator housing;
    a rotor shaft;
    bearing means including a first bearing and a second bearing attach to said housing and to said shaft for rotatably supporting said shaft in said housing, said first bearing and said second bearing being spaced from one another along said shaft, said shaft having an extension couplable to the converter, said extension being located on a side of said first bearing opposite said second bearing, said shaft having a section of reduced diameter in a region about said second bearing, said second bearing having a smaller diameter than said first bearing;
    a rotor;
    a bell-shaped rotor hub having a base portion rigidly coupled to said shaft in an area thereof juxtaposed to said first bearing, said hub having a flange portion attached to said base portion, said flange portion supporting said rotor and projecting towards said second bearing from said base portion;
    a stator; and
    an electronic control element operatively connected to at least one of said rotor and said stator, said control element annularly surrounding said shaft between said hub and said second bearing, said control element being disposed partially within said hub and having an end portion projecting outside of said hub, said end portion being mechanically coupled to said stator, whereby said control element is supported by said stator, said stator and said control element being rotatably mounted in said housing, said housing being provided with end bells having means for permitting access to said stator and said control element for service, inspection and repair work, said means for permitting including closable openings in said end bells.

2. A rotating-field machine connectable to a torque converter, said rotating-field machine comprising:

a stator housing;

a rotor shaft;

bearing means including a first bearing and a second bearing attached to said housing and to said shaft for rotatably supporting said shaft in said housing, said first bearing and said second bearing being spaced from one another along said shaft, said shaft having an extension couplable to the converter, said extension being located on a side of said first bearing opposite said second bearing, said shaft having a section of reduced diameter between said first bearing and said second bearing, said second bearing having a smaller diameter than said first bearing;

a rotor;

a bell-shaped rotot hub having a substantially circular base portion rigidly coupled to said shaft in an area juxtaposed to said first bearing, said hub having a substantially cylindrical flange portion perimetrically attached to said base portion, said flange portion supporting said rotor and projecting towards said second bearing from said base portion;

a stator; and an electronic control element operatively connected to at least one of said rotor and said stator, said control element annularly surrounding said shaft between said hub and said second bearing, said control element being disposed partially within said hub and having an end portion projecting outside of said hub, said end portion being mechanically coupled to said stator, whereby said control element is supported by said stator, said stator and said control element being rotatably mounted in said housing, said housing being provided with end bells having means for permitting access to said stator and said control element for service, inspection and repair work, said means for permitting including closable openings in said end bells.

3. A rotating-field machine according to claim 1 wherein said stator is divided into segments each individually removable through one of said openings, said control element being divided into segments each individually removable through another of said openings.

4. A rotating-field machine according to claim 3 wherein said closable openings are formed by removable end bell parts.

5. A rotating-field machine according to claim 3 wherein said extension is provided with an elastic coupling.

6. A rotating-field machine according to claim 5 wherein said stator is mounted in a vibration-damping manner.

7. A rotating-field machine according to claim 1 wherein said stator is divided into individually removable stator segments and wherein said control element is divided into individually removable control element segments.

8. A rotating-field machine according to claim 1 wherein said extension is provided with an elastic coupling.

9. A rotating-field machine according to claim 8 wherein said stator is mounted in a vibration-damping manner.

10. A rotating-field machine according to claim 1 wherein said shaft tapers down from said hub towards said second bearing.

11. A rotating-field machine according to claim 1 wherein said control element is attachable to said housing, whereby said control element can be supported by said housing.

* * * * *